United States Patent [19]

Wilson et al.

[11] Patent Number: 4,753,812

[45] Date of Patent: Jun. 28, 1988

[54] LIPID SYSTEM FOR FILLER COMPOSITION

[75] Inventors: Lonny L. Wilson, Brunswick; Kenneth W. Player, Olmsted Falls, both of Ohio; Samuel J. Porcello, Toms River; James M. Manns, Glenwood, both of N.J.

[73] Assignee: Durkee Industrial Foods Corp., Cleveland, Ohio

[21] Appl. No.: 744,362

[22] Filed: Jun. 13, 1985

[51] Int. Cl.$^4$ .......................... A23D 5/00; A23G 3/00
[52] U.S. Cl. .................................... 426/250; 426/553; 426/572; 426/607; 426/613; 426/653
[58] Field of Search ............... 426/572, 553, 601, 613, 426/653, 250

[56] References Cited

U.S. PATENT DOCUMENTS

| | | | |
|---|---|---|---|
| Re. 31,754 | 12/1984 | Miller et al. | 426/613 X |
| 3,244,536 | 4/1966 | Kidger | 426/601 X |
| 4,214,012 | 7/1980 | Ainger et al. | 426/607 |
| 4,410,557 | 10/1983 | Miller | 426/607 |
| 4,524,086 | 6/1985 | Player et al. | 426/607 |

*Primary Examiner*—Robert Yoncoskie
*Attorney, Agent, or Firm*—Richard H. Thomas

[57] ABSTRACT

There is disclosed a sandwich cream filling composition comprising a fat matrix consisting essentially of a plastic fat of defined SFI profile and melt point and a hard butter also of defined SFI profile and melt point. The composition is characterized as having good stand-up throughout a wide temperature range from about 50° F. to about 90° F. and an imperceptible solids content at temperatures above about 98.5° F.

10 Claims, No Drawings

LIPID SYSTEM FOR FILLER COMPOSITION

The present invention relates to soft, edible, filler compositions for bakery products such as cookies and, in particular, to a noval fat blend for such filler compositions.

The present invention will be described with reference to products of the type wherein one layer of a cream or filling is interposed between two horizontal baked pieces in a sandwich fashion, although it will be apparent to those skilled in the art that the present invention has other applications.

BACKGROUND ART

Soft, edible filling compositions for baked goods such as sandwich cookies are well known. Conventionally, such fillings are comprised of a hydrogenated fat or blends of fats, sugar, emulsifier and flavor.

In prior U.S. Pat. No. 3,244,536 to Kidger, it is stated that an essential requirement of a good shortening for a filler composition is that the shortening have a wide temperature range over which the fat is soft and workable, and yet in a solid state. This is necessary to give richness and tenderness to the finished product at room temperature, for instance about 70° F., but also to provide a desired degree of hardness at an elevated hot day temperature of about 90° F., to resist flow from the cookie either by gravity or when compressed by biting on the cookies.

In the '536 patent, specifications given for the fat composition are a Solids Fat Index (SFI) at 50° F. of about 45%, at 80° F. of at least about 25%, at 92° F. of at least about 12.5%, and at 100° F., not greater than 3%. At 104° F., the solids content should not be greater than 0.5%.

It is stated in the patent that from the above figures it should be apparent that a good filler fat retains its consistency at room or ambient temperature and melts completely and rapidly at body temperature.

Another requirement of the fat composition is that it have good shelf stability even under hot weather conditions; that is, resistance to oxidation or oxygen degradation. An indication of the oxidative stability of an oil is the number of hours needed for an oil to obtain a peroxide value of 100 under standard conditions, known as the Active Oxygen Method or AOM Stability.

In the practice of the '536 patent, it is proposed to blend a partially hydrogenated fat having a high $C_{18}$ fatty acid content (at least about 50%) with a vegetable oil having a high proportion of lauric acid, and then subject the blend to interesterification. Tallow and lard are indicated to be preferred partially hydrogenated fats. Coconut oil and palm kernel oil are listed as suitable high lauric vegetable oils. The end product is said to have a Wiley Melting Point between about 102° and 108° F., preferably between 102° and 104° F.

One problem with the composition of the '536 patent is that, in order to get the specified solids at 80° F. and 92° F., namely 25 and 12.5%, respectively, it is necessary to carry out the hydrogenation of the tallow or lard to a substantial extent. For instance, it is indicated in the patent that the hydrogenation of tallow is conducted to an Iodine Value of about 25-42. In the case of lard, the hydrogenation is conducted to an Iodine Value of about 41-49. In either event, the hydrogenation is sufficient so that at temperatures above 98.5° F., or body temperature, there is substantial unmelted solids in the composition, leaving what is called a "tail" giving a slightly greasy sensation in the mouth following consumption of the cookie and filling.

In prior U.S. Pat. No. 4,214,012 to Ainger et al, a somewhat similar approach is taken to provide a biscuit cream filling. In this patent, the fat composition is an interesterified blend of a lauric component and a non-lauric component. In an example, an oleine fraction of palm kernel oil, remaining after removal of stearine by fractionation, having an Iodine Value of 15-25, is interesterified with a non-lauric stearine recovered from acetone fractionation of palm oil. The product obtained is one having a slip melting point range between about 28°-40° C. and a dilatation drop of at least about 500 over the last 10° C. below slip melting point. As with the Kidger U.S. Pat. No. 3,244,536, there is no disclosure in this patent concerning the solids remaining, the so-called "tail", following melting of the fat at body temperature, and elimination of whatever slightly greasy sensation that might exist.

It is a principal object of the present invention to overcome the disadvantages of the prior art, and in particular to provide a fat system having an SFI configuration which provides good stand-up through a wide temperature range, but at the same time has at body temperature of 98.5° essentially a zero solids content, or at least a solids content less than a perceptible amount. It is also an object of the present invention to provide a filling composition similar to that of the Kidger patent, but without the so-called "tail". The disclosure of the Kidger patent is incorporated by reference herein.

DISCLOSURE OF INVENTION

The present invention resides in a filling composition for baked goods comprising a sweetening amount of sugar, and a matrix forming amount of a vegetable oil blend having a Wiley Melting Point in the range of about 93°-98° F., an AOM stability of at least about 75 minimum, and an SFI profile as follows:

| Temperature °F. | Approx. SFI Percent | Typical |
| --- | --- | --- |
| 50 | 45-52 | 49 |
| 70 | 26-33 | 28-30 |
| 80 | 9-15 | 11-11 |
| 92 | 5 max | 2-3 |

At body temperature of about 98.5° F., the composition has a zero, or imperceptible, solids content.

The present invention more specifically resides in the discovery that a hydrogenated non-lauric fat or randomly rearranged blend of non-lauric and lauric fact of plastic consistency can be blended with a fractionated hard butter in proportions to provide a fat composition having good stand-up throughout a wide temperature range, but without the so-called "tail", the fat of plastic consistency being one having a Wiley Melting Point of about 85°-99° F., an AOM stability of at least about 75 hours minimum or more, and an SFI profile of

| Temperature °F. | Approx. SFI Percent |
| --- | --- |
| 50 | 28-43 |
| 70 | 14-25 |
| 80 | 8-19 |
| 92 | 0-8 |
| 104 | 0-2 max | and said hard butter having a Wiley Melting Point of about 91°-102° F. and an SFI profile of

| Temperature °F. | Approx. SFI Percent |
| --- | --- |
| 50 | 64-81 |
| 70 | 51-82 |
| 80 | 35-76 |
| 92 | 0-22 |
| 100 | 5 max |

Unexpectedly, it was found that the simple blend of these two materials in the proportion of about 60 to about 95% plastic fat to about 40 to about 5% hard butter meets the desired SFI criteria and, at the same time, has zero or negligible solids content at temperatures above body temperature of about 98.5° F. (The proportions are weight proportions.)

BEST MODE FOR CARRYING OUT THE INVENTION AND INDUSTRIAL APPLICABILITY

The composition of the present invention, as indicated, is a filling or sandwich cream which comprises, typically, about 60% sugar, about 40% fat, and flavor and coloring. Usually, the composition contains lecithin as a processing aid, e.g., for viscosity control, and/or an emulsifier, e.g., mono- and diglyceride for aeration and mouthfeel. The composition is of the type positioned in sandwich fashion between baked cookies, but is also useful with crackers, biscuits and wafers. The flavor of the filling can be chocolate, vanilla, cheese, fruit, or any other desirable flavor. Similarly, the color can be suitably varied.

It is a characteristic of the composition of the present invention that it has stand-up or firmness through a wide temperature range, going from room temperature, e.g., 70° F., to a hot summer day temperature of for instance 90° F. At the same time, through the same temperature range, the composition also has a smooth, creamy, non-grainy texture or mouth-feel desirable in a product of this type.

To achieve this result, a critical aspect of the present invention lies in the composition of the fat, one component being a hydrogenated or rearranged fat, of plastic consistency, having a defined SFI profile and Wiley Melting Point, a second component being a hard butter, also of defined SFI and Wiley Melting Point. One example of a suitable rearranged fat of plastic consistency is Kaola (trademark SCM Corporation) which is a randomly rearranged blend of partially hydrogenated soybean oil and a lauric component, having a Wiley Melting Point of about 87°-93° F. and a SFI profile as follows:

| Temperature °F. | Approx. SFI |
| --- | --- |
| 50 | 40 |
| 70 | 18 |
| 80 | 8 |
| 92 | 2 max. |
| 100 | — |
| 110 | — |

This product has a minimum AOM stability of about 100 hours and a normally plastic consistency. The lauric component may be palm kernel oil, a palm kernel olein fraction, or a partially hydrogenated derivative of either the oil or olein fraction. This product is conventionally marketed as an ingredient for vegetable dairy systems, mellorines, candies, ice cream bar coatings, nut roasting and the like. Preparation of a rearranged fat such as Kaola follows the technology given in prior U.S. Pat. No. 2,726,158, assigned to assignee of the present application, and will be known to those skilled in the art. This technology is not a part of the present invention.

An example of a hydrogenated fat of plastic consistency that meets the criteria of the present invention is Cirol (trademark SCM Corporation), a partially hydrogenated soybean and cottonseed oil blend, which is plastic in consistency, has a WMP of 91°-95° F., and has an SFI profile as follows:

| Temperature °F. | Approx. SFI Percent |
| --- | --- |
| 50 | 28-34 |
| 70 | 14-20 |
| 80 | 8-14 |
| 92 | 5 max |

This composition has an AOM stability of about 75 hours minimum. This product is normally marketed for margarines, frozen desserts, coffee whiteners and as a domestic oil for nut roasting.

Still another hydrogenated fat that can be used in the practice of the present invention is Code 321 (trademark, SCM Corporation). This fat is derived from soybean oil only and is normally plastic in consistency. It has a Wiley Melting Point of 95°-99° F., an AOM stability of 150 hours minimum, and an SFI profile as follows

| Temperature °F. | Approx. SFI |
| --- | --- |
| 50 | 34-43 |
| 70 | 22-25 |
| 80 | 16-19 |
| 92 | 3-8 |
| 104 | 2 max. |

This fat is normally marketed as a filler, or for snack frying prepared foods, or as a spray oil.

All of these fats have in common similar melt points, high AOM stability, and similar SFI profiles which can be characterized as slightly dish-shaped curving downwardly in a concave slope from about 28-43% solids at 50° F. to near zero or zero solids at 98.5° F.

A preferred hard butter useful in the practice of the present invention is Satina 53NH (trademark SCM Corporation), a fractionated, non-hydrogenated palm kernel oil having a Wiley Melting Point of about 91°-94° F., and an SFI profile as follows:

| Temperature °F. | Approx. SFI |
| --- | --- |
| 50 | 71-77 |
| 70 | 66-72 |
| 80 | 53-57 |
| 90 | 0-5 |
| 100 | 0-1 |

This fat is normally used for molding of chocolate flavored and pastel novelties and for enrobing candy centers where a harder, more brittle texture is desired.

Another hard butter useful in the practice of the present invention is Kaomel (trademark, SCM Corporation). Kaomel is marketed in flake form, and is a partially hydrogenated fractionated blend of cottonseed and soybean oil. It has a WMP of 97°-101° F. and an SFI as follows:

| Temperature °F. | Approx. SFI Percent |
| --- | --- |
| 50 | 69 min. |
| 70 | 59 min. |
| 80 | 52 min. |
| 92 | 22 min. |
| 100 | 6 max. |

The fat is usually sold as a non-tempering confectioner's coating and also for cosmetic, pharmaceutical and vegetable dairy systems.

Paramount B (trademark SCM Corporation) is still another example of a hard butter that can be used. This fat is a partially hydrogenated palm kernel oil (lauric) having a Wiley Melting Point of about 93°-96° F. and an SFI profile of:

| Temperature °F. | Approx. SFI Percent |
| --- | --- |
| 50 | 64 min. |
| 70 | 64 min. |
| 80 | 35 min. |
| 92 | 6 min. |
| 100 | 1 max. |

This fat normally is used as a confectioner's coating, a candy center, and for vegetable dairy systems, icings and cosmetic and pharmaceutical applications. Still a fourth hard butter useful in the present invention is Satina 72 (trademark SCM Corporation). This fat has a Wiley Melting Point of about 99°-102° F. and a Solids Fat Index of

| Temperature °F. | Approx. SFI Percent |
| --- | --- |
| 50 | 75-81 |
| 70 | 76-82 |
| 80 | 72-76 |
| 92 | 8-12 |
| 100 | 0-3 |

This fat is a special high solids product having a sharp melt curve. Typical uses for the fat are milk cocoa coating formulae and tropical coatings.

All of these fats have in common a Wiley Melting Point in the range of about 91° to 102° F. and an SFI profile in the shape of a shoulder which remains above about 52% solids to 70° F. and then drops off sharply to a maximum of about 6% solids at 100° F. The hardest fat of the group is Satina 72, and the softest is Paramount B, with the other two about in the middle.

The proportions employed, as mentioned, are about 60 to about 95% plastic fat to about 40 to about 5% hard butter.

In the practice of the present invention, the filling composition preferably is prepared by mixing the fat and other ingredients (sugar, color, flavoring and emulsifiers) at an elevated temperature sufficient to melt the fat components, and then cooling the blend at a controlled rate in a heat exchanger such as a votator. This type of heat exchanger combines continuous mixing with cooling to obtain a fine crystal size growth and a non-grainy, smooth texture.

Cooling can be to a temperature anywhere between 60° and 110° F., the latter giving a slighty finer crystal structure, the former a slightly coarser crystal structure.

An alternative is to votate the lipid components and then cream in the other components; i.e., complete mixing at a temperature below the melting point of the lipid components.

It may be desirable to include in the fat composition of the present invention a small amount (up to about 2%, a basis total fat composition) of a stearine sufficient to function as a seed starter in the cooling and crystallizing step. This small an amount has no noticeable or perceptible affect on the solids content of the blend at temperatures above about 98.5° F.

It also is possible to dilute the sugar content with small amounts of other bulking agents, such as non-fat dry milk. This is disclosed in the prior Kidger U.S. Pat. No. 3,244,536. Spray dried cheese particles can also be used for both flavor and as a bulking ingredient. Other common bulking ingredients can also be used, some of which provide flavor as well as bulk. In this regard, the flavor can be chocolate, vanilla, fruit, cheese and any other flavor compatible with the use intended. Emulsifiers, as mentioned, can be used, in small amounts, to aid in mixing, for instance a small amount of lecithin (e.g.) 0.05 parts per 1000 parts of other ingredients. Mono- and diglycerides can also be used in small amounts for aeration and mouthfeel.

It may be desirable for certain applications, depending upon shipping conditions, point of use, and the like, to modify or compound the bulking composition employed to achieve added stand-up at high temperatures, e.g., 95° F. This can be accomplished using known or conventional technology.

By way of example, a friable protein, such as soy protein, or a high protein bulking agent such as non-fat drymilk, buttermilk solids or whole milk solids, can provide reduced plasticity and/or increased resistance to yield at high temperatures in an oil/bulking agent system. Similarly, starches such as corn syrup solids and low DE maltodextrins are effective in increasing plastic and yield values at high temperatures. Also, certain emulsifiers, for instance, polyglycerol esters of fatty acids, can be incorporated into the fat blend to increase fat plastic and yield values. One example is the emulsifier blend disclosed in copending application Ser. No. 566,094, filed Dec. 27, 1983 and assigned to assignee of the present application.

Although the composition of the present invention is essentially anhydrous, up to about 4% moisture can be present, either added or indigenous, and still have shelf stability.

EXAMPLE

The lipid composition was prepared as a filler fat for a sandwich cookie filling composition:

| Ingredient | Weight Percent |
| --- | --- |
| Randomly rearranged blend of partially hydrogenated soybean oil and palm kernel based component (Kaola, trademark SCM Corporation) | 79% |
| Hard butter (Satina 53NH, trademark SCM Corporation) | 20% |
| Stearine (Durkee 17, trademark SCM Corporation) | 1% |

This blend had an AOM value of 75 hours minimum, an Iodine Value of about 37-40, a Wiley Melting Point of 93°-98° F., and an SFI profile of

| Temperature °F. | Approx. SFI Percent | |
| --- | --- | --- |
| | Range | Typical |
| 50 | 49 ± 3 | 48 |
| 70 | 30 ± 3 | 28 |
| 80 | 12 ± 3 | 12 |
| 92 | 5 max. | 3 |

The composition when blended with flavor, color, sugar, particulate fill an emulsifiers produced a very satisfactory sandwich filling, free of the so-called "tail" normally present.

We claim:

1. In an anhydrous sandwich filling composition for wafers wherein said composition comprises
   (a) a flavoring amount of flavor;
   (b) a coloring amount of colorant;
   (c) a bulking amount of one or more bulking ingredients; and
   (d) a matrix forming amount of a vegetable oil composition, wherein the improvement comprises
      a vegetable oil composition having a Wiley Melting Point in the range of about 93°–98° F., an AOM stability of at least about 75, and an SFI profile of

| Temperature °F. | Approximate SFI Percent |
| --- | --- |
| 50 | 46–52 |
| 70 | 26–33 |
| 80 | 9–15 |
| 92 | 5 max. | said composition having a smooth texture and stand-up through a wide temperature range, and substantially 0% fat solids content at a temperature above about 98.5° F., said vegetable oil composition being a blend comprising
   (1) a fat of plastic consistency having a Wiley Melting Point of about 85°–99° F., an AOM stability of 75 hours minimum, and an SFI profile of

| Temperature °F. | Approximate SFI Percent |
| --- | --- |
| 50 | 28–43 |
| 70 | 14–25 |
| 80 | 8–19 |

| Temperature °F. | Approximate SFI Percent |
| --- | --- |
| 92 | 0–8 |
| 104 | 0–2 ; and |

(2) a hard butter having a Wiley Melting Point of about 91°–102° F. and an SFI profile of

| Temperature °F. | Approximate SFI Percent |
| --- | --- |
| 50 | 64–81 |
| 70 | 51–82 |
| 80 | 35–76 |
| 92 | 0–22 |
| 100 | 5 max. | the ratio of plastic fat to hard butter being in the weight range of about 60:40 to 95:5.

2. A fat blend suitable as a matrix for a filling composition comprising
   (a) a fat of plastic consistency having a Wiley Melting Point of about 85°–99° F., an AOM stability of 75 hours minimum, and an SFI profile of

| Temperature °F. | Approx. SFI |
| --- | --- |
| 50 | 28–43 |
| 70 | 14–25 |
| 80 | 8–19 |
| 92 | 0–8 |
| 104 | 0–2; and |

(b) a hard butter having a Wiley Melting Point of about 91°–102° F. and an SFI profile of

| Temperature °F. | Approx. SFI |
| --- | --- |
| 50 | 64–81 |
| 70 | 51–82 |
| 80 | 35–76 |
| 92 | 0–22 |
| 100 | 5 max. | said blend having substantially 0% fat solids content at temperatures above about 98.5° F.;
   the ratio of plastic fat to hard butter being in the range of about 60:40 to 95:5.

3. A sandwich filling composition comprising the fat blend of claim 2.

4. The filling composition of claim 3 which is substantially anhydrous.

5. A baked product comprising the filling composition of claims 1, 2, 3, or 4.

6. A filler cream having complete melting and rapid get away at body temperature comprising
   (a) an oleaginous composition having a solid fat index of:
      (1) about 46 to about 52 percent solid at 50° F;
      (2) about 26 to about 33 percent solid at 70° F;
      (3) about 9 to about 15 percent solid at 80° F;
      (4) up to 5 percent solid at 92° F; and
      (5) 0 percent solid at 104° F; and
   (b) a sugar mixed into the oleaginous composition.—

* * * * *